(12) United States Patent
Iwahashi et al.

(10) Patent No.: US 6,910,010 B2
(45) Date of Patent: Jun. 21, 2005

(54) FEATURE EXTRACTION APPARATUS AND METHOD AND PATTERN RECOGNITION APPARATUS AND METHOD

(75) Inventors: Naoto Iwahashi, Kanagawa (JP); Hongchang Bao, Tokyo (JP); Hitoshi Honda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/179,549

(22) Filed: Oct. 28, 1998

(65) Prior Publication Data

US 2002/0010583 A1 Jan. 24, 2002

(30) Foreign Application Priority Data

Oct. 31, 1997 (JP) .............................................. 9-300979

(51) Int. Cl.[7] .......................... G10L 15/02; G10L 15/14; G10L 15/20
(52) U.S. Cl. .......................... 704/233; 704/236; 704/245
(58) Field of Search ................................. 704/226, 227, 704/231, 232, 233, 234, 236, 240, 243, 245

(56) References Cited

U.S. PATENT DOCUMENTS

| | | | | |
|---|---|---|---|---|
| 4,718,093 A | * | 1/1988 | Brown | 704/243 |
| 4,897,878 A | * | 1/1990 | Boll et al. | 704/233 |
| 5,185,848 A | * | 2/1993 | Aritsuka et al. | 704/232 |
| 5,497,447 A | * | 3/1996 | Bahl et al. | 704/245 |
| 5,522,011 A | * | 5/1996 | Epstein et al. | 704/222 |
| 5,544,250 A | * | 8/1996 | Urbanski | 381/94.3 |
| 5,638,489 A | * | 6/1997 | Tsuboka | 704/256 |
| 5,680,481 A | | 10/1997 | Prasad et al. | |
| 5,706,394 A | * | 1/1998 | Wynn | 704/219 |
| 5,706,395 A | * | 1/1998 | Arslan et al. | 704/226 |
| 5,754,681 A | * | 5/1998 | Watanabe et al. | 704/231 |
| 5,828,998 A | * | 10/1998 | Iwahashi | 704/236 |
| 5,920,644 A | * | 7/1999 | Fujimoto et al. | 382/159 |

FOREIGN PATENT DOCUMENTS

| | | |
|---|---|---|
| EP | 0582989 | 2/1994 |
| WO | 9106921 | 5/1991 |

OTHER PUBLICATIONS

Stochastic Features for Noise Robust Speech Recognition, Iwahashi et al., Proceedings of The 1998 IEEE International Conference on Acoustics, Speech and Signal Processing, May 15, 1998, vol. 2, pp. 633–636.

Isolated Word Recognition in Noisy Environment by vector Quantization of the HMM and Noise Distributions, Frangoulis, International Conference on Acoustics, Speech and Signal Processing, May 14–17, 1991, vol. CONF. 16, pp. 413–416.

Combining Neural Network Classification with Fuzzy Vector Quantization and Hidden Markov Models for Robust Isolated Word Speech Recognition, Xydeas et al., Proceedings of the 1995 IEEE International Symposium of Information Theory, Sep. 17–22, 1995, p. 174.

Noise Adaptation of HMM Speech Recognition Systems Using Tied–Mixtures in the Spectral Domain, Erell et al., IEEE Transactions on Speech and Audio Processing, col. 5, No. 1, Jan. 1, 1997, pp. 72–72.

* cited by examiner

*Primary Examiner*—Richemond Dorvil
*Assistant Examiner*—Martin Lerner
(74) *Attorney, Agent, or Firm*—Jay H. Maioli

(57) ABSTRACT

A feature extraction and pattern recognition system in which an observation vector forming input data, which represents a certain point in the observation vector space, is mapped to a distribution having a spread in the feature vector space, and a feature distribution parameter representing the distribution is determined. Pattern recognition of the input data is performed based on the feature distribution parameter.

14 Claims, 10 Drawing Sheets

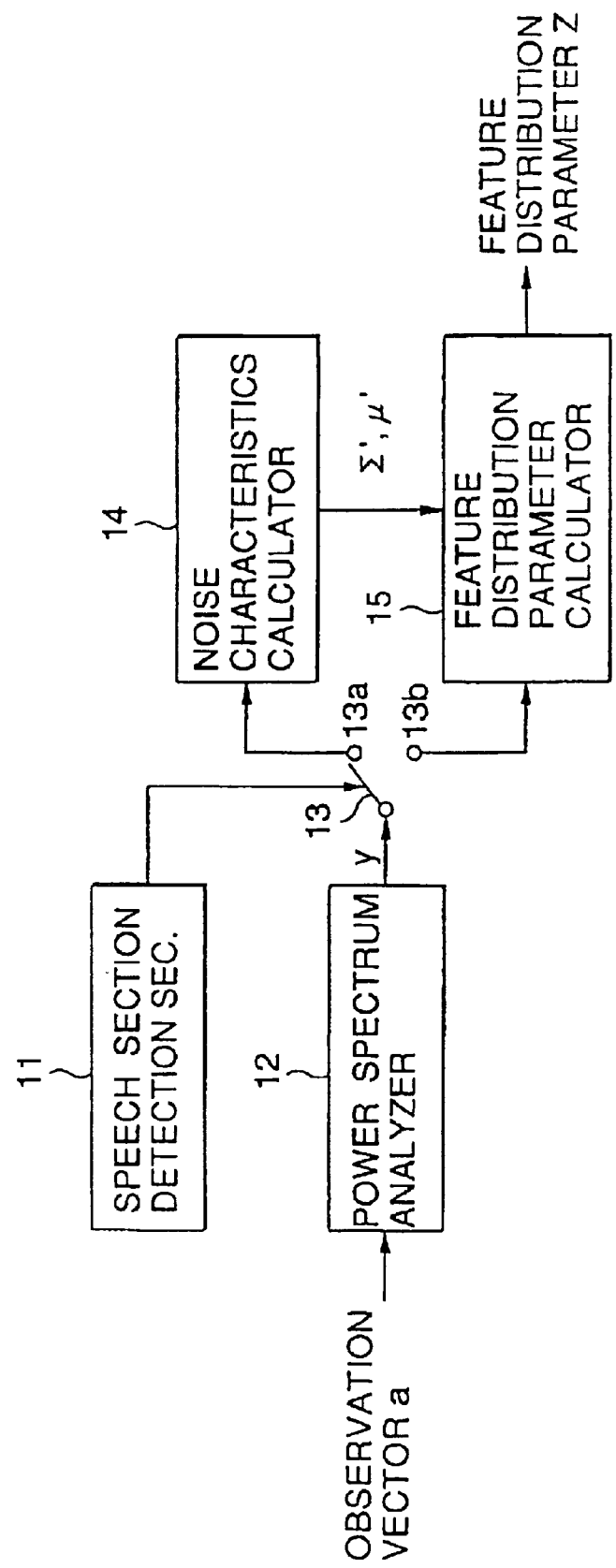

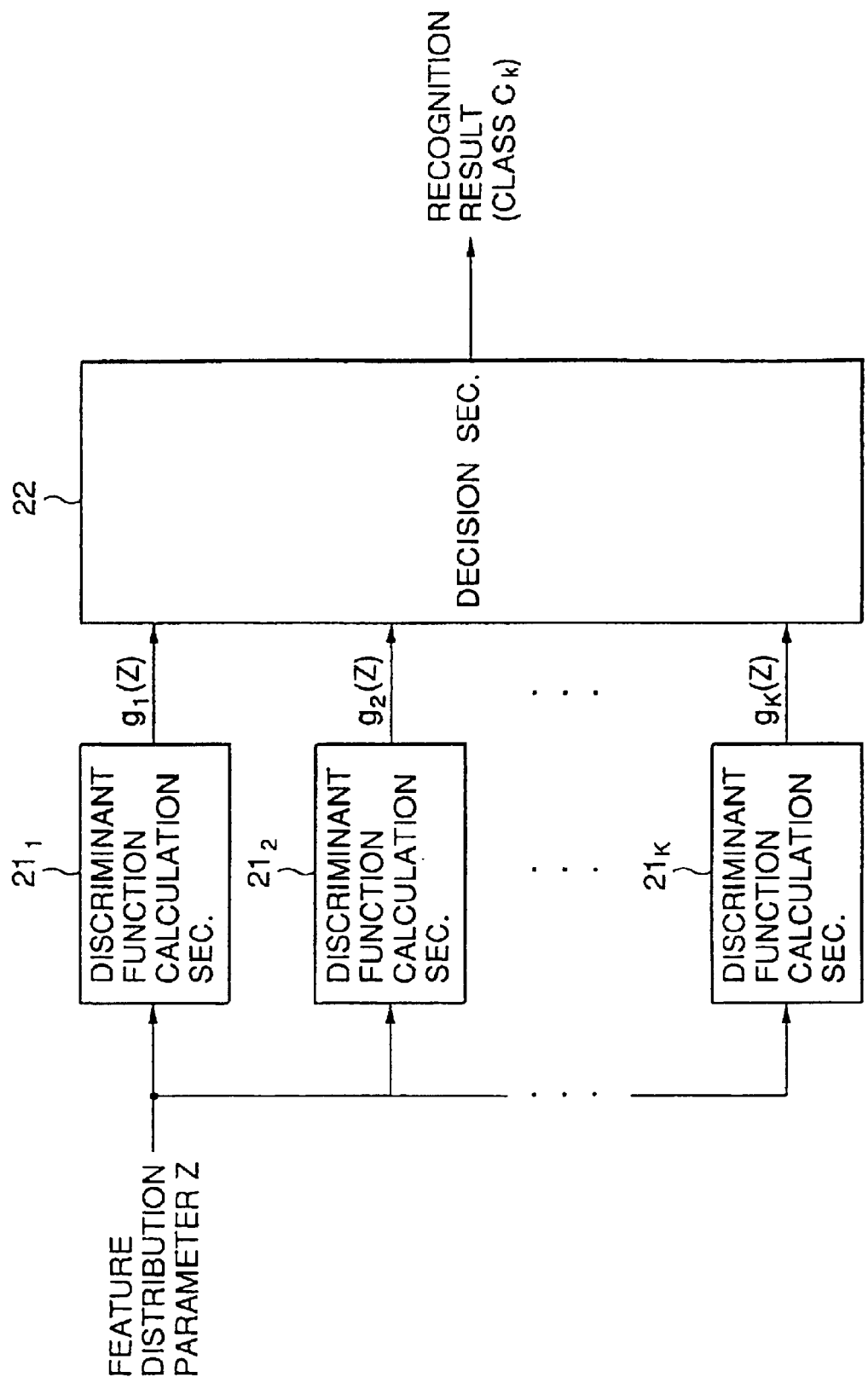

HMM (LEFT-TO-RIGHT MODEL)

FEATURE EXTRACTION APPARATUS AND METHOD AND PATTERN RECOGNITION APPARATUS AND METHOD

BACKGROUND OF THE INVENTION

1. Field of the Invention

The present invention relates to a feature extraction apparatus and method and a pattern recognition apparatus and method. In particular, the invention relates to a feature extraction apparatus and method and a pattern recognition apparatus and method which are suitable for use in a case where speech recognition is performed in a noise environment.

2. Description of the Related Art

FIG. 1 shows an example configuration of a conventional pattern recognition apparatus.

An observation vector as a pattern recognition object is input to a feature extraction section 101. The feature extraction section 101 determines, based on the observation vector, a feature vector that represents its feature quantity. The feature vector thus determined is supplied to a discrimination section 102. Based on the feature vector supplied from the feature extraction section 101, the discrimination section 102 judges which of a predetermined number of classes the input observation vector belongs to.

For example, where the pattern recognition apparatus of FIG. 1 is a speech recognition apparatus, speech data of each time unit (hereinafter referred to as a frame where appropriate) is input to the feature extraction section 101 as an observation vector. The feature extraction section 101 acoustically analyzes the speech data as the observation vector, and thereby extracts a feature vector as a feature quantity of speech such as a power spectrum, cepstrum coefficients, or linear prediction coefficients. The feature vector is supplied to the discrimination section 102. The discrimination section 102 classifies the feature vector as one of a predetermined number of classes. A classification result is output as a recognition result of the speech data (observation vector).

Among known methods for judging which one of a predetermined number of classes a feature vector belongs to in the discrimination section 102 are a method using a Mahalanobis discriminant function, a mixed normal distribution function, or a polynomial function, a method using an HMM method, and a method using a neural network.

For example, the details of the above speech recognition techniques are disclosed in "Fundamentals of Speech Recognition (I) and (II)," co-authored by L. Rabiner and B-H. Juang, translation supervisedby Furui, NTT Advanced Technology Corp., 1995. As for the general pattern recognition, detailed descriptions are made in, for example, R. Duda and P. Hart, "Pattern Classification and Scene Analysis," John Wiley & Sons, 1973.

Incidentally, when pattern recognition is performed, an observation vector (input pattern) as a pattern recognition object generally includes noise. For example, a voice as an observation vector that is input when speech recognition is performed includes noise of an environment of a user's speech (e.g., voices of other persons or noise of a car). To give another example, an image as an observation vector that is input when image recognition is performed includes noise of a photographing environment of the image (e.g., noise relating to weather conditions such as mist or rain, or noise due to lens aberrations of a camera for photographing the image).

Spectral subtraction is known as one of feature quantity (feature vector) extraction methods that are used in a case of recognizing voices in a noise environment.

In the spectral subtraction, an input before occurrence of a voice (i.e., an input before a speech section) is employed as noise and an average spectrum of the noise is calculated. Upon subsequent input of a voice, the noise average spectrum is subtracted from the voice and a feature vector is calculated by using a remaining component as a true voice component.

For example, the details of the spectral subtraction are disclosed in S. F. Boll, "Suppression of Acoustic Noise in Speech Using Spectral Subtraction," IEEE Transactions on Acoustics, Speech, and Signal Processing, Vol. ASSP-27, No. 2, 1979; and P. Lockwood and J. Boudy, "Experiments with a Nonlinear Spectral Subtractor, Hidden Markov Models and the Projection, for Robust Speech Recognition in Cars," Speech Communication, Vol. 11, 1992.

Incidentally, it can be considered that the feature extraction section 101 of the pattern recognition apparatus of FIG. 1 executes a process that an observation vector a representing a certain point in the observation vector space is mapped to (converted into) a feature vector y representing a corresponding point in the feature vector space as shown in FIG. 2.

Therefore, the feature vector y represents a certain point (corresponding to the observation vector a) in the feature vector space. In FIG. 2, each of the observation vector space and the feature vector space is drawn as a three-dimensional space.

In the spectral subtraction, an average noise component spectrum is subtracted from the observation vector a and then the feature vector y is calculated. However, since the feature vector y represents one point in the feature vector space as described above, the feature vector y does not reflect characteristics representing irregularity of the noise such as variance though it reflects the average characteristics of the noise.

Therefore, the feature vector y does not sufficiently reflect the features of the observation vector a, and hence it is difficult to obtain a high recognition rate with such a feature vector y.

The present invention has been made in view of the above circumstances, and an object of the invention is therefore to increase the recognition rate.

SUMMARY OF THE INVENTION

According to a first aspect of the invention, there is provided a feature extraction apparatus which extracts a feature quantity of input data, comprising calculating means for calculating a feature distribution parameter representing a distribution that is obtained when mapping of the input data is made to a space of a feature quantity of the input data.

According to a second aspect of the invention, there is provided a feature extraction method for extracting a feature quantity of input data, comprising the step of calculating a feature distribution parameter representing a distribution that is obtained when mapping of the input data is made to a space of a feature quantity of the input data.

According to a third aspect of the invention, there is provided a pattern recognition apparatus which recognizes a pattern of input data by classifying it as one of a predetermined number of classes, comprising calculating means for calculating a feature distribution parameter representing a distribution that is obtained when mapping of the input data is made to a space of a feature quantity of the input data; and classifying means for classifying the feature distribution parameter as one of the predetermined number of classes.

According to a fourth aspect of the invention, there is provided a pattern recognition method for recognizing a pattern of input data by classifying it as one of a predetermined number of classes, comprising the steps of calculating a feature distribution parameter representing a distribution that is obtained when mapping of the input data is made to a space of a feature quantity of the input data; and classifying the feature distribution parameter as one of the predetermined number of classes.

According to a fifth aspect of the invention, there is provided a pattern recognition apparatus which recognizes a pattern of input data by classifying it as one of a predetermined number of classes, comprising framing means for extracting parts of the input data at predetermined intervals, and outputting each extracted data as 1-frame data; feature extracting means receiving the 1-frame data of each extracted data, for outputting a feature distribution parameter representing a distribution that is obtained when mapping of the 1-frame data is made to a space of a feature quantity of the 1-frame data; and classifying means for classifying a series of feature distribution parameters as one of the predetermined number of classes.

According to a sixth aspect of the invention, there is provided a pattern recognition method for recognizing a pattern of input data by classifying it as one of a predetermined number of classes, comprising a framing step of extracting parts of the input data at predetermined intervals, and outputting each extracted data as 1-frame data; a feature extracting step of receiving the 1-frame data of each extracted data, and outputting a feature distribution parameter representing a distribution that is obtained when mapping of the 1-frame data is made to a space of a feature quantity of the 1-frame data; and a classifying step of classifying a series of feature distribution parameters as one of the predetermined number of classes.

In the feature extraction apparatus according to the first aspect of the invention, the calculating means calculates a feature distribution parameter representing a distribution that is obtained when mapping of the input data is made to a space of a feature quantity of the input data.

In the feature extraction method according to the second aspect of the invention, a feature distribution parameter representing a distribution that is obtained when mapping of the input data is made to a space of a feature quantity of the input data is calculated.

In the pattern recognition apparatus according to the third aspect of the invention, the calculating means calculates a feature distribution parameter representing a distribution that is obtained when mapping of the input data is made to a space of a feature quantity of the input data, and the classifying means classifies the feature distribution parameter as one of the predetermined number of classes.

In the pattern recognition method according to the fourth aspect of the invention, a feature distribution parameter representing a distribution that is obtained when mapping of the input data is made to a space of a feature quantity of the input data is calculated, and the feature distribution parameter is classified as one of the predetermined number of classes.

In a pattern recognition apparatus according to the fifth aspect of the invention which recognizes a pattern of input data by classifying it as one of a predetermined number of classes, parts of the input data are extracted at predetermined intervals, and each extracted data is output as 1-frame data. A feature distribution parameter representing a distribution that is obtained when mapping of the 1-frame data of each extracted data is made to a space of a feature quantity of the 1-frame data is output. Then, a series of feature distribution parameters is classified as one of the predetermined number of classes.

In a pattern recognition method according to the sixth aspect of the invention for recognizing a pattern of input data by classifying it as one of a predetermined number of classes, parts of the input data are extracted at predetermined intervals, and each extracted data is output as 1-frame data. A feature distribution parameter representing a distribution that is obtained when mapping of the 1-frame data of each extracted data is made to a space of a feature quantity of the 1-frame data is output. Then, a series of feature distribution parameters is classified as one of the predetermined number of classes.

BRIEF DESCRIPTION OF THE DRAWINGS

FIG. 6 is a block diagram showing an example configuration of the feature extraction section 2 shown in FIG. 3;

FIG. 8 is a block diagram showing an example configuration of a discrimination section 3 shown in FIG. 3;

DETAILED DESCRIPTION OF THE PREFERRED EMBODIMENT

Figure 1:
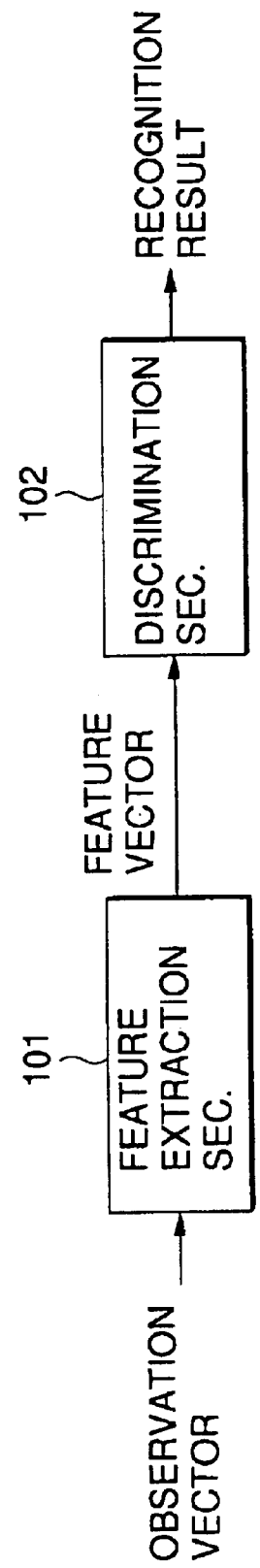
FIG. 1 is a block diagram showing an example configuration of a conventional pattern recognition apparatus.
Figure 2:
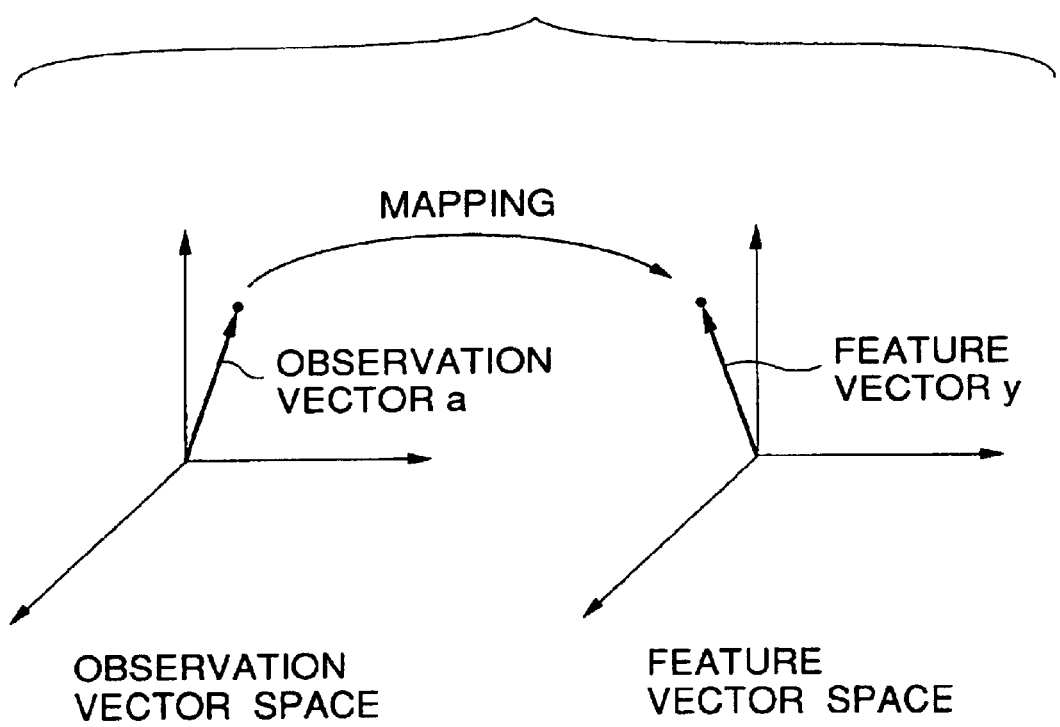
FIG. 2 illustrates a process of a feature extraction section 101 shown in FIG. 1.
Figure 3:
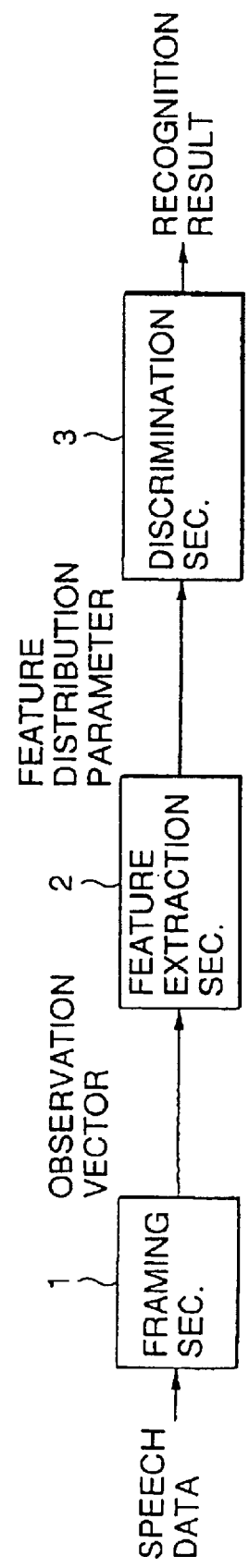
FIG. 3 is block diagram showing an example configuration of a speech recognition apparatus according to an embodiment of the present invention.

FIG. 3 shows an example configuration of a speech recognition apparatus according to an embodiment of the present invention.

Figure 4:
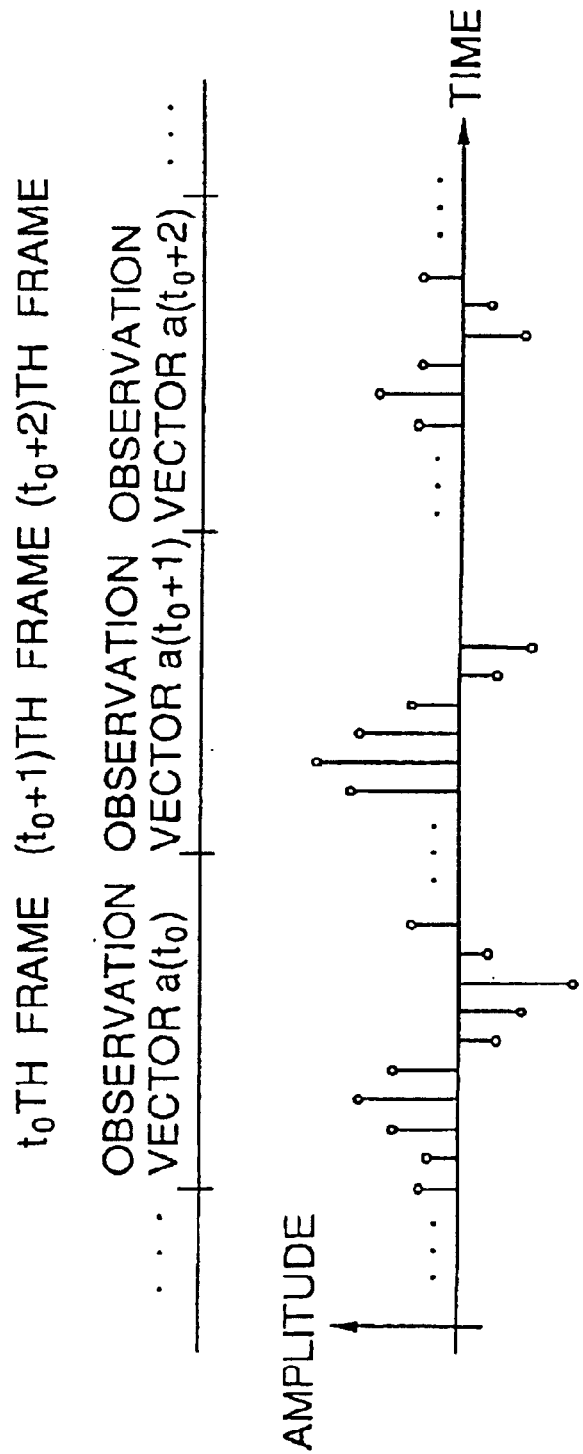
FIG. 4 illustrates a process of a framing section 1 shown in FIG. 3.

Digital speech data as a recognition object is input to a framing section 1. For example, as shown in FIG. 4, the framing section 1 extracts parts of received speech data at predetermined time intervals (e.g., 10 ms; this operation is called framing) and outputs each extracted speech data as 1-frame data. Each 1-frame speech data that is output from the framing section 1 is supplied to a feature extraction section 2 in the form of an observation vector a having respective time-series speech data constituting the frame as components.

In the following, an observation vector as speech data of a t-th frame is represented by a(t), where appropriate.

The feature extraction section 2 (calculating means) acoustically analyzes the speech data as the observation vector a that is supplied from the framing section 1 and thereby extracts a feature quantity from the speech data. For example, the feature extraction section 2 determines a power spectrum of the speech data as the observation vector a by Fourier-transforming it, and calculates a feature vector y having respective frequency components of the power spectrum as components. The method of calculating a power spectrum is not limited to Fourier transform; a power spectrum can be determined by other methods such as a filter bank method.

Further, the feature extraction section 2 calculates, based on the above-calculated feature vector y, a parameter (hereinafter referred to as a feature distribution parameter) Z that represents a distribution, in the space of a feature quantity (i.e., feature vector space), obtained when a true voice included in the speech data as the observation vector a is mapped to points in the feature vector space, and supplies the parameter Z to a discrimination section 3.

Figure 5:
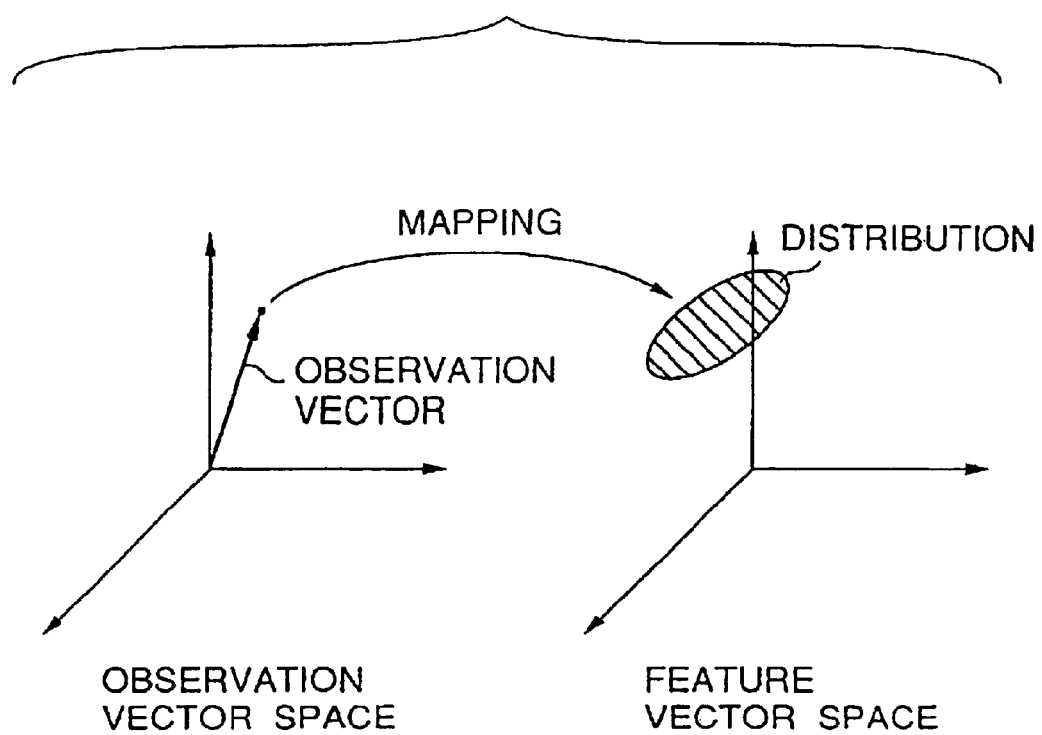
FIG. 5 illustrates a process of a feature extraction section 2 shown in FIG. 3.

That is, as shown in FIG. 5, the feature extraction section 2 calculates and outputs, as a feature distribution parameter, a parameter that represents a distribution having a spread in the feature vector space obtained by mapping of an observation vector a representing a certain point in the observation vector to the feature vector space.

Although in FIG. 5 each of the observation vector space and the feature vector space is drawn as a three-dimensional space, the respective numbers of dimensions of the observation vector space and the feature vector space are not limited to three and even need not be the same.

The discrimination section 3 (classifying means) classifies each of feature distribution parameters (a series of parameters) that are supplied from the feature extraction section 2 as one of a predetermined number of classes, and outputs a classification result as a recognition result of the input voice. For example, the discrimination section 3 stores discriminant functions to be used for judging which of classes corresponding to a predetermined number K of words a discrimination object belongs to, and calculates values of the discriminant functions of the respective classes by using, as an argument, the feature distribution parameter that is supplied from the feature extraction section 2. A class (in this case, a word) having the largest function value is output as a recognition result of the voice as the observation vector a.

Next, the operation of the above apparatus will be described.

The framing section 1 frames input digital speech data as a recognition object. Observation vectors a of speech data of respective frames are sequentially supplied to the feature extraction section 2. The feature extraction section 2 determines a feature vector y by acoustically analyzing the speech data as the observation vector a that is supplied from the framing section 1. Further, based on the feature vector y thus determined, the feature extraction section 2 calculates a feature distribution parameter Z that represents a distribution in the feature vector space, and supplies it to the discrimination section 3. The discrimination section 3 calculates, by using the feature distribution parameter supplied from the feature extraction section 2, values of the discriminant functions of the respective classes corresponding to the predetermined number K of words, and outputs a class having the largest function value as a recognition result of the voice.

Since speech data as an observation vector a is converted into a feature distribution parameter Z that represents a distribution in the feature vector space (space of a feature quantity of speech data) as described above, the feature distribution parameter Z reflects distribution characteristics of noise included in the speech data. Further, since the voice is recognized based on such a feature distribution parameter Z, the recognition rate can greatly be increased.

FIG. 6 shows an example configuration of the feature extraction section 2 shown in FIG. 3.

An observation vector a is supplied to a power spectrum analyzer 12. The power spectrum analyzer 12 Fourier-transforms the observation vector a according to, for instance, a FFT (fast Fourier transform) algorithm, and thereby determines (extracts), as a feature vector, a power spectrum that is a feature quantity of the voice. It is assumed here that an observation vector a as speech data of one frame is converted into a feature vector that consists of D components (i.e., a D-dimensional feature vector).

Now, a feature vector obtained from an observation vector a(t) of a t-th frame is represented by y(t). Further, a true voice component spectrum and a noise component spectrum of the feature vector y(t) are represented by x(t) and u(t), respectively. In this case, the component spectrum x(t) of the true voice is given by $$x(t)=y(t)-u(t) \quad (1)$$

where it is assumed that noise has irregular characteristics and that the speech data as the observation vector a(t) is the sum of the true voice component and the noise.

Figure 7A:
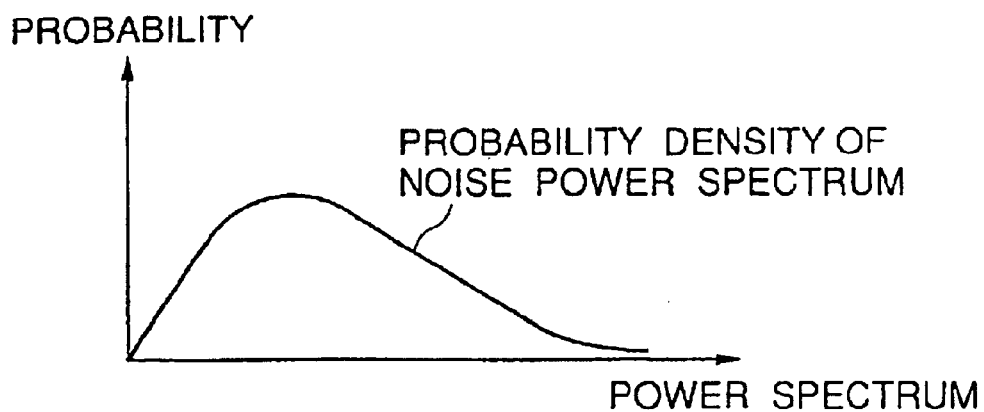
FIGS. 7A and 7B show probability density functions of a noise power spectrum and a true voice power spectrum.
Figure 7B:
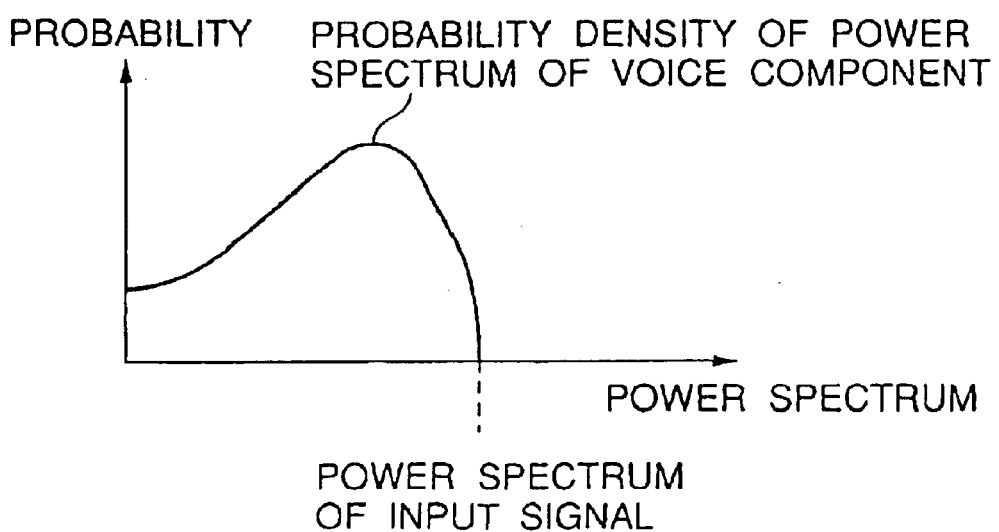

Since the noise u(t) has irregular characteristics, u(t) is a random variable and hence x(t), which is given by Equation (1), is also a random variable. Therefore, for example, if the noise power spectrum has a probability density function shown in FIG. 7A, the probability density function of the power spectrum of the true voice is given as shown in FIG. 7B according to Equation (1). The probability that the power spectrum of the true voice has a certain value is obtained by multiplying, by a normalization factor that makes the probability distribution of the true voice have an area of unity, a probability that the noise power spectrum has a value obtained by subtracting the above value of the power spectrum of the true voice from the power spectrum of the input voice (input signal). FIGS. 7A and 7B are drawn with an assumption that the number of components of each of u(t), x(t), and y(t) is one (D=1).

Returning to FIG. 6, the feature vector y(t) obtained by the power spectrum analyzer 12 is supplied to a switch 13. The switch 13 selects one of terminals 13a and 13b under the control of a speech section detection section 11.

The speech section detection section 11 detects a speech section (i.e., a period during which a user is speaking). For example, the details of a method of detecting a speech section are disclosed in J. C. Junqua, B. Mark, and B. Reaves, "A Robust Algorithm for Word Boundary Detection in the Presence of Noise," IEEE Transaction Speech and Audio Processing, Vol. 2, No. 3, 1994.

A speech section can be recognized in other ways, for example, by providing a proper button in the speech recognition apparatus and having a user manipulate the button while he is speaking.

The speech section detection section 11 controls the switch 13 so that it selects the terminal 13b in speech sections and the terminal 13a in the other sections (hereinafter referred to as non-speech sections where appropriate).

Therefore, in a non-speech section, the switch 13 selects the terminal 13a, whereby an output of the power spectrum analyzer 12 is supplied to a noise characteristics calculator 14 via the switch 13. The noise characteristics calculator 14 calculates noise characteristics in a speech section based on the output of the power spectrum analyzer 12 in the non-speech section.

In this example, the noise characteristics calculator 14 determines average values (average vector) and variance (a variance matrix) of noise with assumptions that a noise power spectrum u(t) in a certain speech section has the same distribution as that in the non-speech section immediately preceding that speech section and that the distribution is a normal distribution.

Specifically, assuming that the first frame of the speech section is a No. 1 frame (t=1), an average vector $\mu'$ and a variance matrix $\Sigma'$ of outputs y(−200) to y(−101) of the power spectrum analyzer 12 of 100 frames (from a frame preceding the speech section by 200 frames to a frame preceding the speech section by 101 frames) are determined as noise characteristics in the speech section.

The average vector $\mu'$ and the variance matrix $\Sigma'$ can be determined according to $$\mu'(i) = \frac{1}{100} \sum_{t=-200}^{-101} y(t)(i) \quad (2)$$

$$\Sigma'(i,j) = \frac{1}{100} \sum_{t=-200}^{-101} (y(t)(i) - \mu'(i))(y(t)(j) - \mu'(j))$$

where $\mu'(i)$ represents an ith component of the average vector $\mu'$ (i=1, 2, ..., D), y(t)(i) represents an ith component of a feature vector of a t-th frame, and $\Sigma'(i,j)$ represents an ith-row, jth-column component of the variance matrix $\Sigma'$ (j=1, 2, ..., D).

Here, to reduce the amount of calculation, it is assumed that for noise the components of the feature vector y have no mutual correlation. In this case, the components other than the diagonal components of the variance matrix $\Sigma'$ are zero as expressed by $$\Sigma'(i,j) = 0, \; i \neq j \quad (3)$$

The noise characteristics calculator 14 determines the average vector $\mu'$ and the variance matrix $\Sigma'$ as noise characteristics in the above-described manner and supplies those to a feature distribution parameter calculator 15.

On the other hand, the switch 13 selects the terminal 13b in the speech section, whereby an output of the power spectrum analyzer 12, that is, a feature vector y as speech data including a true voice and noise, is supplied to a feature distribution parameter calculator 15 via the switch 13. Based on the feature vector y that is supplied from the power spectrum analyzer 12 and the noise characteristics that are supplied from the noise characteristics calculator 14, the feature distribution parameter calculator 15 calculates a feature distribution parameter that represents a distribution of the power spectrum of the true voice (distribution of estimated values).

That is, with an assumption that the power spectrum of the true voice has a normal distribution, the feature distribution parameter calculator 15 calculates, as a feature distribution parameter, an average vector $\xi$ and a variance matrix $\psi$ of the distribution according to the following formulae:

$$\xi(t)(i) = E[x(t)(i)] \quad (4)$$

$$= E[y(t)(i) - u(t)(i)]$$

$$= \int_0^{y(t)(i)} (y(t)(i) - u(t)(i)) \frac{P(u(t)(i))}{\int_0^{y(t)(i)} P(u(t)(i)) du(t)(i)} du(t)(i)$$

$$= y(t)(i) \frac{\int_0^{y(t)(i)} P(u(t)(i)) du(t)(i) -}{}$$

$$= \frac{\int_0^{y(t)(i)} u(t)(i) P(u(t)(i)) du(t)(i)}{\int_0^{y(t)(i)} P(u(t)(i)) du(t)(i)}$$

$$= y(t)(i) - \frac{\int_0^{y(t)(i)} u(t)(i) P(u(t)(i)) du(t)(i)}{\int_0^{y(t)(i)} P(u(t)(i)) du(t)(i)}$$

If $i=j$, $\psi(t)(i,j) = V[x)(t)(i)] = E[(x(t)(i))^2] - (E[x(t)(i)])^2 (= E[(x(t)(i))^2] - (\xi(t)(i))^2)$ If $i \neq j$, $\psi(t)(i,j) = 0$. $\quad (5)$ $$E[(x(t)(i))^2] = E[(y(t)(i) - u(t)(i))^2] \quad (6)$$

$$= \int_0^{y(t)(i)} (y(t)(i) - u(t)(i))^2 \frac{P(u(t)(i))}{\int_0^{y(t)(i)} P(u(t)(i)) du(t)(i)} du(t)(i)$$

$$= \frac{1}{\int_0^{y(t)(i)} P(u(t)(i)) du(t)(i)} \times$$

$$\left\{ (y(t)(i))^2 \int_0^{y(t)(i)} P(u(t)(i)) du(t)(i) - \right.$$

$$2 y(t)(i) \int_0^{y(t)(i)} u(t)(i) P(u(t)(i)) du(t)(i) +$$

$$\left. \int_0^{y(t)(i)} (u(t)(i))^2 P(u(t)(i)) du(t)(i) \right\}$$

$$= (y(t)(i))^2 - 2 y(t)(i) \frac{\int_0^{y(t)(i)} u(t)(i) P(u(t)(i)) du(t)(i)}{\int_0^{y(t)(i)} P(u(t)(i)) du(t)(i)} +$$

$$\frac{\int_0^{y(t)(i)} (u(t)(i))^2 P(u(t)(i)) du(t)(i)}{\int_0^{y(t)(i)} P(u(t)(i)) du(t)(i)}$$

$$P(u(t)(i)) = \frac{1}{\sqrt{2\pi \Sigma'(i,i)}} e^{-\frac{1}{2\Sigma'(i,i)}(u(t)(i) - \mu'(i))^2} \quad (7)$$

In the above formulae, $\xi(t)(i)$ represents an ith component of an average vector $\xi(t)$ of a t-th frame, E[ ] means an average value of a variable in brackets "[ ]," and x(t)(i) represents an ith component of a power spectrum x(t) of the true voice of the t-th frame. Further, u(t)(i) represents an ith component of a noise power spectrum of the t-th frame, and P(u(t)(i)) represents a probability that the ith component of the noise power spectrum of the t-th frame is u(t)(i). In this example, since the noise distribution is assumed to be a normal distribution, P(u(t)(i)) is given by Equation (7).

Further, $\psi(t)(i,j)$ represents an ith-row, jth-column component of a variance matrix $\psi(t)$ of the t-th frame, and V[ ] means variance of a variable in brackets "[ ]."

In the above manner, the feature distribution parameter calculator 15 determines, for each frame, an average vector $\xi$ and a variance matrix $\psi$ as a feature distribution parameter representing a distribution of the true voice in the feature vector space (i.e., a normal distribution as assumed to be a distribution of the true voice in the feature vector space)

Then, when the speech section has finished, the switch 13 selects the terminal 13a and the feature distribution parameter calculator 15 outputs the feature parameter that has been determined for each frame in the speech section are output to the discrimination section 3. That is, assuming that the speech section consists of T frames and that a feature distribution parameter determined for each of the T frames is expressed as $z(t)=\{\xi(t), \psi(t)\}$ where $t=1, 2, \ldots, T$, the feature distribution parameter calculator 15 supplies a feature distribution parameter (a series of parameters) $Z=\{z(1), z(2), \ldots, z(T)\}$ to the discrimination section 3.

The feature extraction section 2 thereafter repeats similar processes.

FIG. 8 shows an example configuration of the discrimination section 3 shown in FIG. 3.

The feature distribution parameter Z that is supplied from the feature extraction section 2 (feature distribution parameter calculator 15) is supplied to K discriminant function calculation sections $21_1$–$21_K$. The discriminant function calculation section $21_k$ stores a discriminant function $g_k(Z)$ for discrimination of a word corresponding to a kth class of the K classes ($k=1, 2, \ldots, K$), and the discriminant function $g_k(Z)$ is calculated by using, as an argument, the feature distribution parameter Z that is supplied from the feature extraction section 2.

The discrimination section 3 determines a word as a class according to an HMM (hidden Markov model) method, for example.

Figure 9:
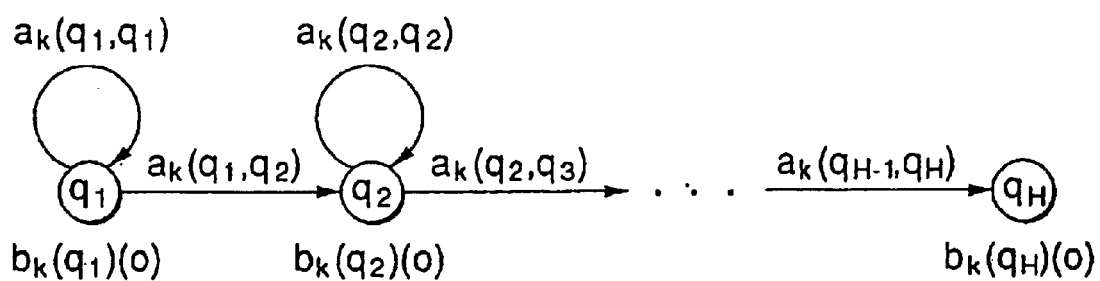
FIG. 9 shows an HMM.

In this embodiment, for example, an HMM shown in FIG. 9 is used. In this HMM, there are H states $q_1$–$q_H$ and only a self-transition and a transition to the right adjacent state are permitted. The initial state is the leftmost state $q_1$ and the final state is the rightmost state $q_H$, and a state transition from the final state $q_H$ is prohibited. A model in which no transition occurs to states on the left of the current state is called a left-to-right model. A left-to-right model is generally employed in speech recognition.

Now, a model for discrimination of a kth class of the HMM is called a kth class model. For example, the kth class model is defined by a probability (initial state probability) $\pi_k(q_h)$ that the initial state is a state $q_h$, a probability (transition probability) $a_k(q_i, q_j)$ that a state $q_i$ is established at a certain time point (frame) t and a state transition to a state $q_j$ occurs at the next time point t+1, and a probability (output probability) $b_k(q_i)(O)$ that a state $q_i$ outputs a feature vector O when a state transition occurs from the state $q_i$ ($h=1, 2, \ldots, H$).

When a feature vector series $O_1, O_2, \ldots$ is supplied, the class of a model having, for example, a highest probability (observation probability) that such a feature vector series is observed is selected as a recognition result of the feature vector series.

In this example, the observation probability is determined by using the discriminant function $g_k(Z)$. That is, the discriminant function $g_k(Z)$ is given by the following equation as a function for determining a probability that the feature distribution parameter (series) $z=\{z_1, z_2, \ldots, z_T\}$ is observed in an optimum state series (i.e., an optimum manner of state transitions) for the feature distribution parameter (series) $z=\{z_1, z_2, \ldots, z_T\}$.

$$g_k(Z) = \max_{q_1, q_2, \ldots, q_T} \pi_k(q_1) \cdot b'_k(q_1)(z_1) \cdot a_k(q_1, q_2) \cdot \tag{8}$$
$$b'_k(q_2)(z_2) \ldots a_k(q_{T-1}, q_T) \cdot b'_k(q_T)(z_T)$$

In the above equation, $b_k'(q_i)(z_i)$ represents an output probability for an output having a distribution $z_j$. In this embodiment, for example, an output probability $b_k(s)(O_t)$, which is a probability that each feature vector is output at a state transition, is expressed by a normal distribution function with an assumption that components in the feature vector space have no mutual correlation. In this case, when an input has a distribution $z_t$, an output probability $b_{k'}(s)(Z_t)$ can be determined by the following equation that includes a probability density function $P_k^m(s)(x)$ that is defined by an average vector $\mu_k(s)$ and a variance matrix $\Sigma_k(s)$ and a probability density function $P^f(t)(x)$ that represents a distribution of a feature vector (in this embodiment, a power spectrum) of a t-th frame.

$$b'_k(s)(z_t) = \int P^f(t)(x) P_k^m(s)(x) dx \tag{9}$$
$$= \prod_{i=1}^{D} P(s)(i)(\xi(t)(i), \Psi(t)(i, i))$$

$k = 1, 2, \ldots, K : s = q_1, q_2, \ldots, q_T : T = 1, 2, \ldots, T$

In Equation (9), the integration interval of the integral is the entire D-dimensional feature vector space (in this example, the power spectrum space).

In Equation (9), $P(s)(i)(\xi(t)(i), \psi(t)(i, i))$ is given by $$P(s)(i)(\xi(t)(i), \Psi(t)(i, i)) = \tag{10}$$
$$\frac{1}{\sqrt{2\pi(\Sigma_k(s)(i, i) + \Psi(t), (i, i))}} e^{-\frac{(\mu_k(s)(i) - \xi(t)(i))^2}{2(\Sigma_k(s)(i,i) + \Psi(t)(i,i))}}$$

where $\mu_k(s)(i)$ represents an ith component of an average vector $\mu_k(s)$ and $\Sigma_k(s)(i, i)$ represents an ith-row, ith-column component of a variance matrix $\Sigma_k(s)$. The output probability of the kth class model is defined by the above equations.

As mentioned above, the HMM is defined by the initial state probabilities $\pi_k(q_h)$, the transition probabilities $a_k(q_i, q_j)$, and the output probabilities $b_k(q_i)(O)$, which are determined in advance by using feature vectors that are calculated based on learning speech data.

Where the HMM shown in FIG. 9 is used, transitions start from the leftmost state $q_1$. Therefore, the initial probability of only the state $q_1$ is 1 and the initial probabilities of the other states are 0. As seen from Equations (9) and (10), if terms $\psi(t)(i, i)$ are 0, the output probability is equal to an output probability in a continuous HMM in which the variance of feature vectors is not taken into consideration.

An example of an HMM learning method is a Baum-Welch re-estimation method.

The discriminant function calculation section $21_k$ shown in FIG. 8 stores, for the kth class model, the discriminant function $g_k(Z)$ of Equation (8) that is defined by the initial state probabilities $\pi_k(q_h)$, the transition probabilities $a_k(q_1, q_j)$, and the output probabilities $b_k(q_i)(O)$ which have been determined in advance through learning. The discriminant function calculation section $21_k$ calculates the discriminant function $g_k(Z)$ by using a feature distribution parameter Z that is supplied from the feature extraction section 2, and outputs a resulting function value (above-described observation probability) $g_k(Z)$ to a decision section 22.

The decision section 22 determines a class to which the feature distribution parameter Z, that is, the input voice, belongs to by applying, for example, a decision rule of the following formula to function values $g_k(Z)$ that are supplied from the respective determinant function calculation sections $21_1$–$21_K$ (i.e., the input voice is classified as one of the classes).

$$C(Z) = C_k, \text{ if } g_k(Z) = \max\{g_i(Z)\} \tag{11}$$

where C(Z) is a function of a discrimination operation (process) for determining a class to which the feature distribution parameter Z belongs to. The operation "max" on the right side of the second equation of Formula (11) means the maximum value of function values $g_i(Z)$ following it (i=1, 2, ..., K).

The decision section 22 determines a class according to Formula (11) and outputs it as a recognition result of the input voice.

Figure 10:
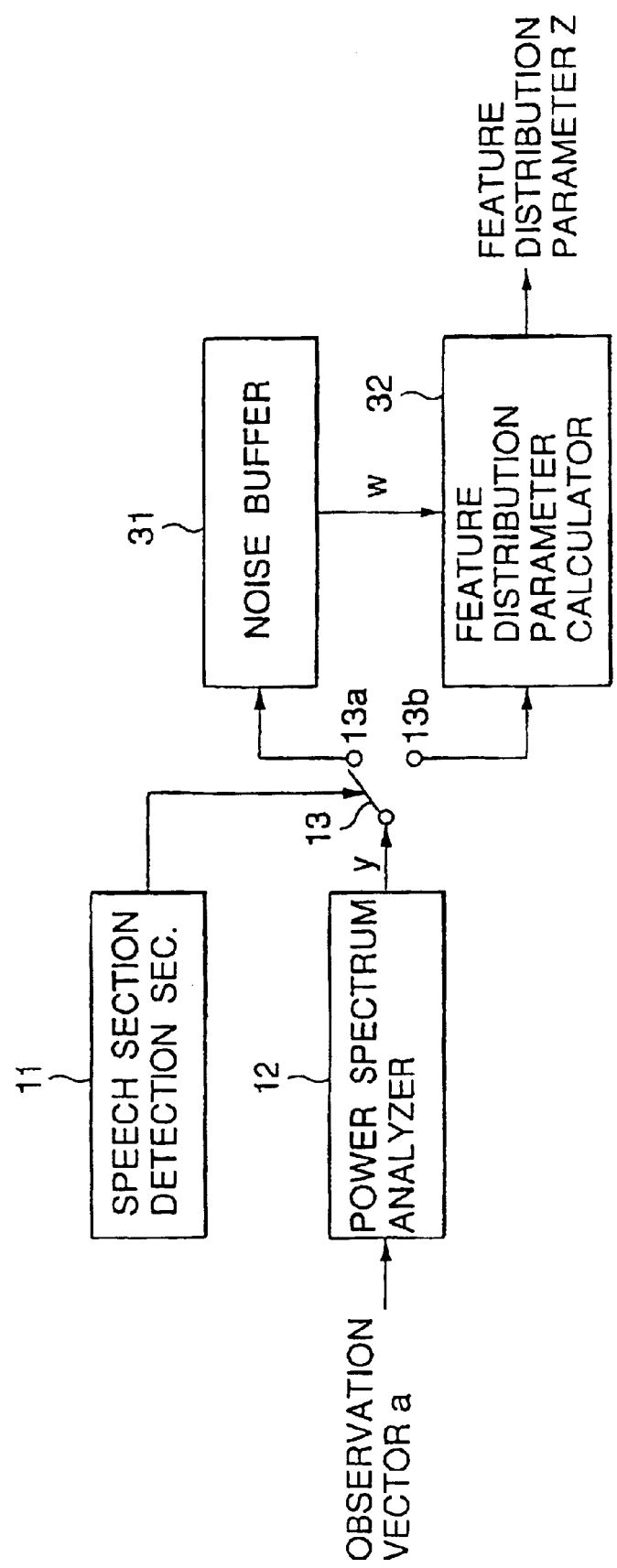
FIG. 10 is a block diagram showing another example configuration of the feature extraction section 2 shown in FIG. 3.

FIG. 10 shows another example configuration of the feature extraction section 2 shown in FIG. 3. The components in FIG. 10 having the corresponding components in FIG. 6 are given the same reference symbols as the latter. That is, this feature extraction section 2 is configured basically in the same manner as that of FIG. 6 except that a noise buffer 31 and a feature distribution parameter calculator 32 are provided instead of the noise characteristics calculator 14 and the feature distribution parameter calculator 15, respectively.

In this example, for example, the noise buffer 31 temporarily stores, as noise power spectra, outputs of the power spectrum analyzer 12 in a non-speech section. For example, the noise buffer 31 stores, as noise power spectra, w(1), w(2), ..., w(100) that are respectively outputs y(−200), y(−199), ..., y(−101) of the power spectrum analyzer 12 of 100 frames that precede a speech section by 200 frames to 101 frames, respectively.

The noise power spectra w(n) of 100 frames (n=1, 2, ..., N; in this example, N=100) are output to the feature distribution parameter calculator 32 when a speech section has appeared.

When the speech section has appeared and the feature distribution parameter calculator 32 has received the noise power spectra w(n)(n=1, 2, ..., N) from the noise buffer 31, the feature distribution parameter calculator 32 calculates, for example, according to the following equations, an average vector $\xi(t)$ and a variance matrix $\Sigma(t)$ that define a distribution (assumed to be a normal distribution) of a power spectrum of a true voice (i.e., a distribution of estimated values of the power spectrum of the true voice).

$$\xi(t)(i) = E[x(t)(i)] = \frac{1}{N}\sum_{n=1}^{N}(y(t)(i) - w(n)(i)) \quad (12)$$

$$\Psi(t)(i, j) = \frac{1}{N}\sum_{n=1}^{N}((y(t)(i) - w(n)(i) - \xi(t)(i)) \times$$

$$(y(t)(j) - w(n)(j) - \xi(t)(j)))$$

$$j = 1, 2, ..., D: j = 1, 2, ..., D$$

where w(n)(i) represents an ith component of an nth noise power spectrum w(n)(w(n)(j) is defined similarly).

The feature distribution parameter calculator 32 determines an average vector $\xi(t)$ and a variance matrix $\Sigma(t)$ for each frame in the above manner, and outputs a feature distribution parameter Z={$z_1, z_2, ..., z_T$} in the speech section to the discrimination section 3 (a feature distribution parameter $z_t$ is a combination of $\xi(t)$ and $\Sigma(t)$).

While in the case of FIG. 6 it is assumed that components of a noise power spectrum have no mutual correlation, in the case of FIG. 10 a feature distribution parameter is determined without employing such an assumption and hence a more accurate feature distribution parameter can be obtained.

Although in the above examples a power spectrum is used as a feature vector (feature quantity), a cepstrum, for example, can also be used as a feature vector.

Now assume that $x^c(t)$ represents a cepstrum of a true voice of a certain frame t and that its distribution (distribution of estimated values of the cepstrum) is a normal distribution, for example. An average vector $\xi^c(t)$ and a variance matrix $\psi^c(t)$ that define a probability density function $P^f(t)(x^c)$ that represents a distribution of a feature vector (in this case, a cepstrum) $x^c$ of the t-th frame can be determined according to the following equations.

$$\xi^c(t)(i) = \frac{1}{N}\sum_{n=1}^{N}x^c(t)(n)(i) \quad i = 1, 2, ..., D \quad (13)$$

$$\Psi^c(t)(i, j) = \frac{1}{N}\sum_{n=1}^{N}(x^c(t)(n)(i) - \xi^c(t)(i))(x^c(t)(n)(j) -$$

$$\xi^c(t)(j))$$

$$i = 1, 2, ..., D: j = 1, 2, ..., D$$

where $\xi^c(t)(i)$ represents an ith component of the average vector $\xi^c(t)$, $\psi^c(t)(i, j)$ is an ith-row, jth-column component of the variance matrix $\psi^c(t)$, and $x^c(t)(n)(i)$ is an ith component of a cepstrum $x^c(t)(n)$ that is given by the following equations.

$$x^c(t)(n) = Cx^L(t)(n)$$

$$x^L(t)(n) = (x^L(t)(n)(1), x^L(t)(n)(2), ..., x^L(t)(n)(D))$$

$$x^L(t)(n)(i) = \log(y(t)(i) - w(n)(i)) \quad (14)$$

where i=1, 2, ..., D. In the first equation of Equations (14), C is a DCT (discrete cosine transform) matrix.

Where a cepstrum is used as a feature vector, the feature extraction section 2 of FIG. 3 may determine an average vector $\xi^c(t)$ and a variance matrix $\psi^c(t)$ for each frame in the above manner, and output a feature distribution parameter $z^c = \{z_1^c, z_2^c, ..., z_t^c\}$ in a speech section to the discrimination section 3 (a feature distribution parameter $z_t^c$ is a combination $\{\xi^c(t), \psi^c(t)\}$.

In this case, an output probability $b_k'(s)(z_t^c)$, which is used to calculate a discriminant function $g_k(Z^c)$ in the discrimination section 3, can be determined, as a probability representing a distribution in the cepstrum space, by the following equation that includes a probability density function $P_k^m(s)(x^c)$ that is defined by an average vector $\mu_k^c(s)$ and a variance matrix $\Sigma_k^c(s)$ and a probability density function $P^f(t)(x^c)$ that represents a distribution of a feature vector (in this case, a cepstrum) of a t-th frame.

$$b_k'(s)(z_t^c) = \int P^f(x^c)P_k^m(s)(x^c)dx^c \quad (15)$$

$$= \frac{e^{-\frac{1}{2}(\xi^c(t) - \mu_k^c(s))^T(\Psi^c(t) + \Sigma_k^c(s))^{-1}(\xi^c(t) - \mu_k^c(s))}}{(2\pi)^{\frac{D}{2}}\left|\Psi^c(t) + \Sigma_k^c(s)\right|^{\frac{1}{2}}}$$

In Equation (15), the integration interval of the integral is the entire D-dimensional feature vector space (in this case, cepstrum space). The term $(\xi^c(t) - \mu_k^c(s))^T$ is a transpose of a vector $\xi^c(t) - \mu_k^c(s)$.

Since, as described above, a feature distribution parameter is determined that reflects noise distribution characteristics and speech recognition is performed by using the thus-determined feature distribution parameter, the recognition rate can be increased.

Table 1 shows recognition rates in a case where a speech recognition (word recognition) experiment utilizing the feature distribution parameter was conducted by using a cepstrum and an HMM method as a feature quantity of speech and a speech recognition algorithm of the discrimination section 3, respectively, and recognition rates in a case where a speech recognition experiment utilizing the spectral subtraction was conducted.

TABLE 1

| | Recognition rate (%) | |
|---|---|---|
| Speech input environment | SS method | Invention |
| Idling and background music | 72 | 86 |
| Running in city area | 85 | 90 |
| Running on expressway | 57 | 69 |

In the above experiments, the number of recognition object words was 5,000 and a speaker was an unspecific person. Speaking was performed in three kinds of environments, that is, an environment that the car was in an idling state and background music is heard, an environment that the car was running in a city area, and an environment that the car was running on an expressway.

As seen from Table 1, in any of those environments, a higher recognition rate was obtained by the speech recognition utilizing the feature distribution parameter.

The speech recognition apparatus to which the invention is applied has been described above. This type of speech recognition apparatus can be applied to a car navigation apparatus capable of speech input and other various apparatuses.

In the above embodiment, a feature distribution parameter is determined which reflects distribution characteristics of noise. It is noted that, for example, the noise includes external noise in a speaking environment as well as characteristics of a communication line (when a voice that is transmitted via a telephone line or some other communication line is to be recognized).

For example, the invention can also be applied to learning for a particular speaker in a case of specific speaker recognition. In this case, the invention can increase the learning speed.

The invention can be applied to not only speech recognition but also pattern recognition such as image recognition. For example, in the case of image recognition, the image recognition rate can be increased by using a feature distribution parameter that reflects distribution characteristics of noise that is lens characteristics of a camera for photographing images, weather states, and the like.

In the above embodiment, a feature distribution parameter that represents a distribution in the power spectrum space or the cepstrum space is determined. However, other spaces such as a space of linear prediction coefficients, a space of a difference between cepstrums of adjacent frames, and a zero-cross space can also be used as a space in which to determine a distribution.

In the above embodiment, a feature distribution parameter representing a distribution in a space of one (kind of) feature quantity of speech is determined. However, it is possible to determine feature distribution parameters in respective spaces of a plurality of feature quantities of speech. It is also possible to determine a feature distribution parameter in one or more of spaces of a plurality of feature quantities of speech and perform speech recognition by using the feature distribution parameter thus determined and feature vectors in the spaces of the remaining feature quantities.

In the above embodiment, a distribution of a feature vector (estimated values of a feature vector of a true voice) in the feature vector space is assumed to be a normal distribution, and a feature distribution parameter representing such a distribution is used. However, other distributions such as a logarithmic normal probability distribution, a discrete probability distribution, and a fuzzy distribution can also be used as a distribution to be represented by a feature distribution parameter.

Further, in the above embodiment, class discrimination in the discrimination section 3 is performed by using an HMM in which the output probability is represented by a normal distribution. However, it is possible to perform class discrimination in the discrimination section 3 in other ways, for example, by using an HMM in which the output probability is represented by a mixed normal probability distribution or a discrete distribution, or by using a normal probability distribution function, a logarithmic probability distribution function, a polynomial function, a neural network, or the like.

As described above, in the feature extraction apparatus and method according to the invention, a feature distribution parameter representing a distribution that is obtained when mapping of input data is made to a space of a feature quantity of the input data is calculated. Therefore, for example, when input data includes noise, a parameter that reflects distribution characteristics of the noise can be obtained.

In the pattern recognition apparatus and method according to the invention, a feature distribution parameter representing a distribution that is obtained when mapping of input data is made to a space of a feature quantity of the input data is calculated, and the feature distribution parameter is classified as one of a predetermined number of classes. Therefore, for example, when input data includes noise, a parameter that reflects distribution characteristics of the noise can be obtained. This makes it possible to increase the recognition rate of the input data.

What is claimed is:

1. A pattern recognition apparatus for recognizing a pattern of time serial unclassified input data by classifying the unclassified input data as one of a predetermined number of classes, comprising:

framing means for sequentially extracting a plurality of frames from the unclassified input data at predetermined frame intervals and outputting the extracted data as frame data;

calculating means for calculating an average vector and a variance matrix as a feature distribution parameter for each frame of the plurality of frames extracted from the unclassified input data, said feature distribution parameter representing a distribution obtained when the frame data is mapped to a space of a feature quantity of the unclassified input data; and classifying means for classifying a series of the feature distribution parameters as one of the predetermined number of classes.

2. The pattern recognition apparatus according to claim 1, wherein the unclassified input data is speech data.

3. The pattern recognition apparatus according to claim 2, wherein the calculating means calculates a feature distribution parameter representing a distribution of the speech data in a power spectrum space.

4. The pattern recognition apparatus according to claim 2, wherein the calculating means calculates a feature distribution parameter representing a distribution of the speech data in a cepstrum space.

5. The pattern recognition apparatus according to claim 2, wherein the calculating means comprises:

acoustic analyzing means for acoustically analyzing the frame data;

noise characteristic calculating means for calculating noise characteristics based on a result of the acoustic analysis of the frame data; and feature distribution parameter calculating means for calculating the feature distribution parameter of a true voice based on the result of the acoustic analysis of the frame data and the calculated noise characteristics.

6. The pattern recognition apparatus according to claim 5, wherein the calculating means further comprises:

speech section detection means for detecting speech sections; and selection means for selecting the feature distribution parameter calculating means in the speech section, for selecting the noise characteristic calculating means in a section other than the speech section, and for providing an acoustic analysis result of the frame data.

7. The pattern recognition apparatus according to claim 5, wherein the noise characteristic calculating means calculates the noise characteristics based on a result of the acoustic analysis of the frame data in non-speech sections; and the feature distribution parameter calculating means calculates the feature distribution parameter of a true voice based on a result of the acoustic analysis of the frame data in the speech section and on the calculated noise characteristics.

8. A pattern recognition method for recognizing a pattern of time serial unclassified input data by classifying the unclassified input data as one of a predetermined number of classes, comprising:

a framing step of sequentially extracting a plurality of frames from the unclassified input data at predetermined frame intervals and outputting each extracted frame as frame data;

a calculating step of calculating an average vector and a variance matrix as a feature distribution parameter for each frame of the plurality of frames extracted from unclassified input data, said feature distribution parameter representing a distribution obtained when the frame data is mapped to a space of a feature quantity of the unclassified input data; and a classifying step of classifying a series of the feature distribution parameters as one of the predetermined number of classes.

9. The pattern recognition method according to claim 8, wherein the unclassified input data is speech data.

10. The pattern recognition method according to claim 9, wherein a feature distribution parameter representing a distribution of the speech data in a power spectrum space is calculated in the calculating step.

11. The pattern recognition method according to claim 9, wherein a feature distribution parameter representing a distribution of the speech data in a cepstrum space is calculated in the calculating step.

12. The pattern recognition method according to claim 9, wherein the calculating step comprises:

an acoustic analyzing step for acoustically analyzing the frame data;

a noise characteristic calculating step for calculating noise characteristics based on a result of the acoustic analysis of the frame data; and a feature distribution parameter calculating step of for calculating the feature distribution parameter of a true voice based on the result of the acoustic analysis result of the frame data and on the noise characteristics.

13. The pattern recognition method according to claim 12, wherein the calculating step further comprises:

a speech section detection step for detecting speech sections; and a selection step for selecting the feature distribution parameter calculating step in the speech section, for selecting the noise characteristics calculating step in non-speech sections, and for providing the result of the acoustic analysis of the frame data.

14. The pattern recognition method according to claim 12, wherein the noise characteristics are calculated in the noise characteristic calculating step based on a result of the acoustic analysis of the frame data in non-speech sections; and the feature distribution parameter of a true voice is calculated in the feature distribution parameter calculating step based on the result of the acoustic analysis of the frame data in speech sections and on the noise characteristics.

* * * * *